United States Patent
Lim et al.

(10) Patent No.: US 7,394,229 B2
(45) Date of Patent: Jul. 1, 2008

(54) SWITCHED RELUCTANCE GENERATOR

(75) Inventors: Jun-young Lim, Incheon (KR); Yong-won Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/296,306

(22) Filed: Dec. 8, 2005

(65) Prior Publication Data

US 2006/0232069 A1 Oct. 19, 2006

(30) Foreign Application Priority Data

Apr. 1, 2005 (KR) ...................... 10-2005-0027625

(51) Int. Cl.
| | |
|---|---|
| H02P 9/10 | (2006.01) |
| H02P 9/14 | (2006.01) |
| H02P 1/46 | (2006.01) |
| H02P 3/18 | (2006.01) |
| H02P 6/00 | (2006.01) |
| H02P 23/00 | (2006.01) |

(52) U.S. Cl. ......................................... 322/59; 318/701
(58) Field of Classification Search ................... 322/59; 318/701

See application file for complete search history.

(56) References Cited

U.S. PATENT DOCUMENTS

| | | | | |
|---|---|---|---|---|
| 4,395,675 | A | * | 7/1983 | Toumani ...................... 323/271 |
| 4,578,630 | A | * | 3/1986 | Grosch ........................ 323/271 |
| 4,743,812 | A | * | 5/1988 | Dishner ........................ 318/14 |
| 5,225,712 | A | * | 7/1993 | Erdman ........................ 290/44 |
| 5,289,361 | A | * | 2/1994 | Vinciarelli .................... 363/80 |
| 5,327,069 | A | * | 7/1994 | Radun et al. .................. 322/10 |
| 5,545,964 | A | * | 8/1996 | Stephenson et al. ......... 318/701 |
| 5,548,196 | A | * | 8/1996 | Lim ............................. 318/701 |
| 5,563,488 | A | * | 10/1996 | Stephenson et al. ......... 318/701 |
| 5,703,457 | A | * | 12/1997 | Davis ........................... 318/701 |
| 5,705,918 | A | * | 1/1998 | Davis ............................ 322/94 |
| 5,880,549 | A | * | 3/1999 | Chiba et al. .................. 310/168 |

(Continued)

FOREIGN PATENT DOCUMENTS

JP 2006288184 A * 10/2006

(Continued)

OTHER PUBLICATIONS

U.S. Appl. No. 11/319,473 to Lim et al., which was filed on Dec. 29, 2005.

(Continued)

*Primary Examiner*—Julio Gonzalez
*Assistant Examiner*—Pedro J Cuevas
(74) *Attorney, Agent, or Firm*—Greenblum & Bernstein, P.L.C.

(57) ABSTRACT

A Switched Reluctance (SR) generator having improved efficiency at low and high speed is disclosed. The SR generator includes a step-up converter for controlling an excitation voltage of an excitation capacitor capable of providing a phase winding with an excitation current. Therefore, the SR generator can control the excitation current, and can provide a phase winding with a sufficient excitation current, thereby improving efficiency. The step-up converter is arranged between a battery capable of storing generated power and the excitation capacitor, boosts a voltage of the battery, and provides the excitation capacitor with the boosted voltage. Therefore, the SR generator does not include an additional power-supply unit for a boosting function, resulting in simplification of an overall structure and reduction of a production cost.

10 Claims, 6 Drawing Sheets

U.S. PATENT DOCUMENTS

| | | | | |
|---|---|---|---|---|
| 5,900,712 | A * | 5/1999 | Disser et al. | 318/701 |
| 5,936,386 | A * | 8/1999 | Heglund | 322/94 |
| 5,973,482 | A * | 10/1999 | Meinert | 322/86 |
| 6,051,951 | A * | 4/2000 | Arai et al. | 318/700 |
| 6,268,666 | B1 * | 7/2001 | Bhowmik | 307/72 |
| 6,300,746 | B1 * | 10/2001 | Mueller et al. | 322/29 |
| 6,369,461 | B1 * | 4/2002 | Jungreis et al. | 307/46 |
| 6,661,206 | B2 * | 12/2003 | Gallegos-Lopez | 322/23 |
| 6,819,008 | B2 * | 11/2004 | Kaplan et al. | 290/44 |
| 6,825,575 | B1 * | 11/2004 | Edelson | 290/40 C |
| 6,855,016 | B1 * | 2/2005 | Jansen | 440/6 |
| 6,930,897 | B2 * | 8/2005 | Jungreis et al. | 363/95 |
| 7,049,786 | B1 * | 5/2006 | Toliyat et al. | 318/701 |
| 7,075,273 | B2 * | 7/2006 | O'Gorman et al. | 322/28 |
| 7,105,938 | B2 * | 9/2006 | Edelson | 290/40 A |
| 7,157,885 | B2 * | 1/2007 | Nakagawa et al. | 322/28 |
| 7,239,113 | B2 * | 7/2007 | Johnson | 322/58 |
| 2005/0116474 | A1 * | 6/2005 | Edelson | 290/40 A |
| 2006/0028778 | A1 * | 2/2006 | O'Gorman et al. | 361/62 |
| 2006/0043938 | A1 * | 3/2006 | O'Gorman et al. | 322/8 |
| 2006/0232069 | A1 * | 10/2006 | Lim et al. | 290/1 R |
| 2006/0232251 | A1 * | 10/2006 | Lim et al. | 322/89 |
| 2006/0250105 | A1 * | 11/2006 | Jadric et al. | 318/701 |
| 2006/0266044 | A1 * | 11/2006 | Donnelly et al. | 60/698 |
| 2006/0266255 | A1 * | 11/2006 | Donnelly et al. | 105/61 |
| 2006/0266256 | A1 * | 11/2006 | Donnelly et al. | 105/61 |
| 2007/0120539 | A1 * | 5/2007 | Bray et al. | 322/59 |
| 2007/0273322 | A1 * | 11/2007 | Ramu | 318/701 |

FOREIGN PATENT DOCUMENTS

KR          100246205          12/1999

OTHER PUBLICATIONS

English Language Abstract of the same which corresponds to KR 1998-19781.

* cited by examiner

Winding

SWITCHED RELUCTANCE GENERATOR

BACKGROUND OF THE INVENTION

1. Field of the Invention

The present invention relates to a Switched Reluctance (SR) generator, and a more particularly to an SR generator for improving generation performance at low and high speed.

2. Description of the Related Art

Generally, an SR generator has been widely used as an energy conversion device, such that it transmits electric energy from a voltage source to a winding having one or more phases via an electric switching operation during a predetermined rotor angle period, and takes more electric energy than that received in the winding from the winding during the remaining rotor angle periods. The above-mentioned additional energy is indicative of mechanical energy applied to a generator rotor when torque is rotationally applied to the SR generator. The SR generator has an output signal configured in the form of a current source, so that it can generate electricity.

Although conventional wind power stations have widely used an induction generator or a synchronous generator, the induction generator must maintain a predetermined speed when generating electricity whereas it has a simple structure and a low production cost, such that it requires an additional gearbox and has a limited range of wind velocity at which electricity is generated. The synchronous generator has disadvantages in that it has a complicated structure and is expensive. The synchronous generator outputs a low output voltage at a low wind velocity, such that it is unable to charge a battery with electricity.

Therefore, although induction or synchronous generators have been widely used to generate electricity in an area having a low wind velocity, many problems occur when generating electricity. The applicant of the present invention has recognized that the SR generator can be improved to be suitable for an application field in a process during which a generator capable of efficiently performing wind power generation has been developed.

SUMMARY OF THE INVENTION

Therefore, the present invention has been made in view of the above problems, and it is an object of the invention to provide an SR generator having improved efficiency at low and high speed.

It is another object of the present invention to provide an SR generator having a simplified structure and superior endurance.

In accordance with one aspect of the present invention, these objects are accomplished by providing an SR generator comprising: a step-up converter for controlling an excitation voltage of an excitation capacitor capable of providing a phase winding with an excitation current.

Therefore, the SR generator can control the excitation current, and can provide a phase winding with a sufficient excitation current, thereby improving efficiency.

In accordance with another aspect of the present invention, the step-up converter is arranged between a battery capable of storing generated power and the excitation capacitor, boosts a voltage of the battery, and provides the excitation capacitor with the boosted voltage.

Therefore, the SR generator does not include an additional power-supply unit for a boosting function, resulting in simplification of the overall structure and reduction of a production cost.

In accordance with yet another aspect of the present invention, the step-up converter is operated when a rotor rotation speed is less than a predetermined speed. The step-up converter increases the excitation current in inverse proportion to the rotor rotation speed.

Therefore, the SR generator improves unique efficiency at a low speed.

In accordance with yet another aspect of the present invention, the step-up converter is operated when the rotor rotation speed is higher than a predetermined speed. Preferably, the step-up converter increases the excitation current in proportion to the rotor rotation speed.

Therefore, the SR generator improves unique efficiency at a high speed.

In accordance with yet another aspect of the present invention, the SR generator increases inductance of the phase winding at a low speed, and decreases the inductance of the phase winding at a high speed.

Therefore, a change rate between the inductance and a phase angle is increased at a low speed, and output energy is also increased at a low speed, thereby improving generation efficiency.

In accordance with yet another aspect of the present invention, the SR generator has a single-phase structure.

Therefore, the number of necessary switches of the SR generator is reduced, resulting in a simple structure and reduction of a production cost.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
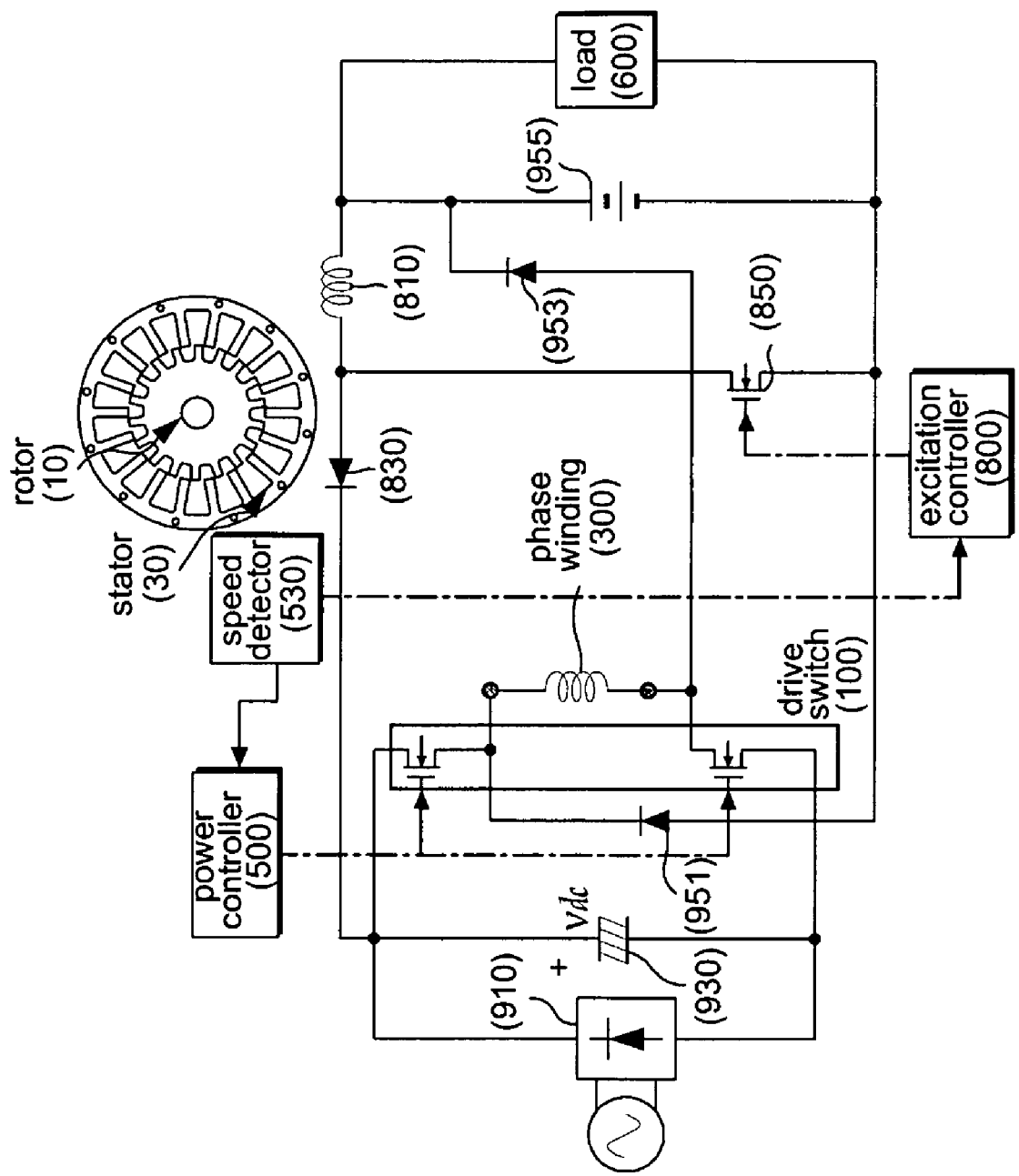
FIG. 1 is a circuit diagram illustrating an SR generator in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a circuit diagram illustrating an SR generator in accordance with a preferred embodiment of the present invention. Referring to FIG. 1, the SR generator includes a rotor 10, a stator 30 on which a phase winding 300 is wound, a drive switch 100 for controlling a current signal flowing in the phase winding 300, and a power controller 500 for controlling a switching operation of the drive switch 100.

The SR generator must initially receive an excitation current. For this purpose, an independent generation system generates a necessary power-supply signal by driving a small-sized synchronous motor connected in parallel to the SR generator. In FIG. 1, a current source 910 is a motor for generating an initial excitation current, for example, a BLDC motor. The excitation current generated from the motor is charged in the excitation capacitor 930. Once the excitation capacitor 930 is charged, a voltage charged in the excitation capacitor 930 is supplied to the phase winding 300 via the drive switch 100 within a predetermined range of a rotor rotation angle, and redundant electric energy induced in the phase winding 300 is charged in the battery 955 within a predetermined range of another rotor rotation angle. The power controller 500 switches on or off the drive switch 100 according to a rotor rotation angle detected by the speed detector 530, and controls the above-mentioned operation.

The phase winding 300 receives electric energy from the excitation capacitor 930 acting as a voltage source within a predetermined rotor angle range because of an electronic switching operation of the drive switch 100, and provides a battery 955 with more energy than received energy within other rotor angle ranges. The power controller 500 for controlling an electronic switching operation of the drive switch 100 generates a pulse-width modulation signal capable of controlling the above switching operation according to a rotor position detected by a speed detector 530. The power controller 500 can be implemented with various forms, and a variety of power controllers have been well known to those skilled in the art. As well known in the art, the speed detector 530 can be implemented with various forms, for example, a speed detector using a hall sensor, and another speed detector using a current detection scheme. For example, the speed detector 530 detects a displacement, and differentiates the detected displacement. Otherwise, the speed detector 530 counts the number of pulse trains generated from an encoder during a predetermined time, such that it can detect a speed of the SR generator.

An output signal of the battery 955 is supplied to a load 600. Selectively, an output signal of the battery 955 may be supplied to the load 600 via a step-up DC-DC converter. Diodes 951 and 953 prevent power charged in the battery from being counter-induced to the phase winding.

In accordance with a preferred embodiment of the present invention, the phase winding 300 for use in the stator has a single-phase structure. The single-phase SR generator has a small number of switches for energy conversion, such that it can be implemented with a low price. However, it should be noted that the present invention is not limited to the above-mentioned example, and can be modified to take different forms.

In the preferred embodiment shown in FIG. 1, the SR generator includes a step-up converter for controlling an excitation voltage of the excitation capacitor 930 capable of providing the phase winding with an excitation current. In accordance with a second preferred embodiment of the present invention, the step-up converter is positioned between the battery 955 for storing generated power therein and the excitation capacitor 930. The step-up converter boosts power of the battery 955, and provides the excitation capacitor 930 with the boosted power. In accordance with the first preferred embodiment of the present invention, the step-up converter is implemented with a boost converter. In other words, the present invention exemplarily shows the simplest boost converter circuit for convenience of description and better understanding of the present invention. The boost converter circuit includes a boost inductor 810 for receiving a current signal from the battery 955; a switch 850 for switching on or off the provision of an inductor current; and a diode 830 for providing the excitation capacitor with a current signal by switching on or off the switch 850, and preventing the occurrence of a counter-current flow. Operations of the above-mentioned boost converter circuit have been well known to those skilled in the art, so that their detailed description will herein be omitted for convenience of description.

In the preferred embodiment shown in FIG. 1, the SR generator includes a speed detector 530 for detecting a rotation speed of the rotor; and an excitation controller 800 for operating the boost converter when the rotor rotation speed detected by the speed detector 530 is less than a predetermined speed. In this case, it is preferable that the excitation controller 800 controls the boost converter to allow an excitation current to be increased in inverse proportion to the rotor rotation speed.

In accordance with the second preferred embodiment of the present invention, the excitation controller 800 operates the boost converter when the rotor rotation speed detected by the speed detector 530 is equal to or higher than a predetermined speed. In this case, the excitation controller 800 controls the boost converter to allow the excitation current to be increased in proportion to the rotor rotation speed.

The principle of the above-mentioned operations of the boost converter will hereinafter be described in detail using the following equations.

A voltage equation for use in the SR generator can be represented by the following equation 1:

$$v = Ri + \frac{d\phi}{dt} = Ri + L\frac{di}{dt} + i\frac{d\theta}{dt}\frac{dL}{d\theta} = Ri + L\frac{di}{dt} + e \quad \text{[Equation 1]}$$

where e can be denoted by the following equation 2:

$$e = i\frac{d\theta}{dt}\frac{dL}{d\theta} = i\omega_m\frac{dL}{d\theta} \quad \text{[Equation 2]}$$

Therefore, the flow of energy can be denoted by the following equation 3:

$$vi = Ri^2 + Li\frac{di}{dt} + i^2\frac{d\theta}{dt}\frac{dL}{d\theta} = Ri^2 + \frac{d}{dt}\left(\frac{1}{2}Li^2\right) + \frac{1}{2}i^2\omega_m\frac{dL}{d\theta} \quad \text{[Equation 3]}$$

where a first term is indicative of a copper loss, a second term is indicative of the sum of a core loss and magnetic energy, and a third term is indicative of generation energy acting as a mechanical output value. During a first period denoted by $$\frac{dL}{d\theta} > 0,$$

the mechanical output value is a positive (+) value, such that the SR generator is used as a motor. During a second period denoted by $$\frac{dL}{d\theta} < 0,$$

the mechanical output value is a negative (−) value, such that the SR generator is used as a generator.

The third term indicative of power energy acquired from the generator can be represented by the following equation 4:

$$\text{Energy} = \frac{1}{2}i^2\omega_m\frac{dL}{d\theta} \quad \text{[Equation 4]}$$

where i is proportional to an excitation current supplied to the phase winding. The higher the excitation current, the higher the generation energy. In other words, the value of angular velocity is decreased at a low speed, so that the generation energy is also decreased. In accordance with a characteristic aspect of the present invention, if an excitation voltage is increased to increase the excitation current, the current i is also increased, thereby maintaining generation energy. In this case, the excitation current is increased in inverse proportion to the speed, so that a decrement of the angular velocity ω can be compensated for.

Figure 2:
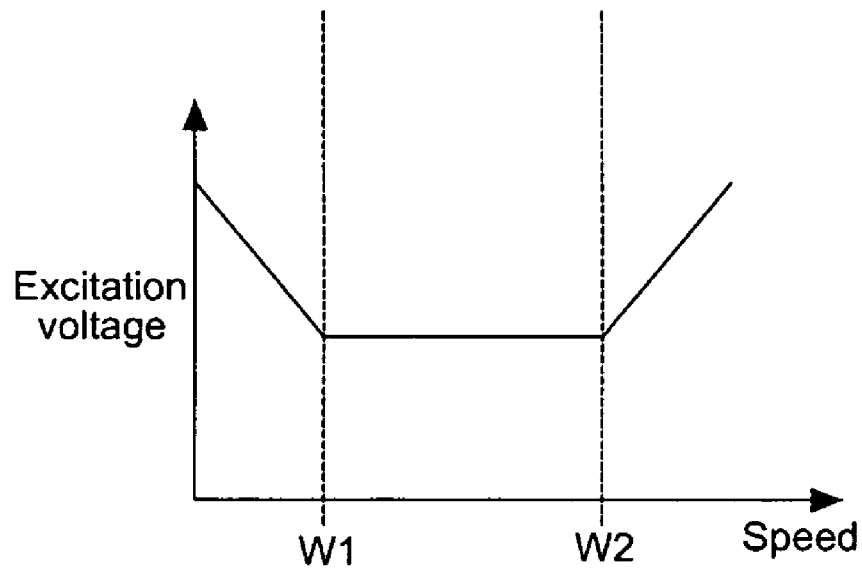
FIG. 2 is a graph illustrating the relationship between a compensated excitation voltage and a speed in accordance with the present invention.
Figure 3:
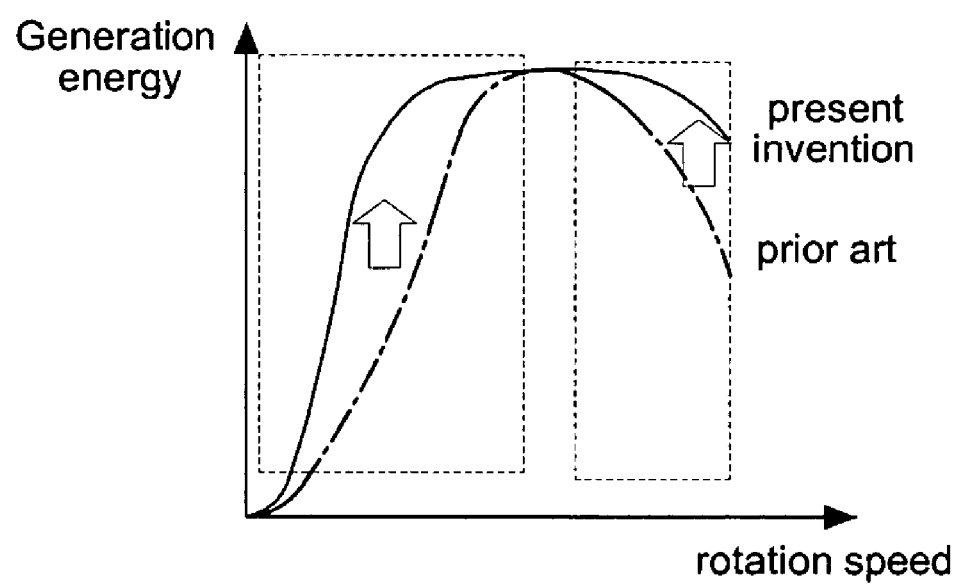
FIG. 3 is a graph illustrating the relationship between generation energy obtained by a compensated excitation voltage and a rotor rotation speed in accordance with the present invention.

Also, although the angular velocity ω is high at a high speed, a time necessary for the excitation is decreased, an excitation current is also reduced, thereby lowering generation energy. In this case, the excitation voltage is increased so that the value of the excitation current is also increased, thereby maintaining generation energy. In this case, the value of the excitation current is increased in proportion to a speed, and a substantial excitation current is maintained, so that generation energy can be compensated for. FIG. 2 is a graph illustrating the relationship between a compensated excitation voltage and a speed in accordance with the present invention. As shown in FIG. 2, the angular velocities $\omega_1$ and $\omega_2$ at which a compensation operation begins can be determined to be appropriate values. FIG. 3 is a graph illustrating the relationship between generation energy obtained by a compensated excitation voltage and a rotor rotation speed in accordance with the present invention. As shown in FIG. 3, the conventional SR motor has a small amount of generation energy in a low-speed area and a high-speed area, but it can be noted that relatively smoothing characteristics are obtained.

Figure 4:
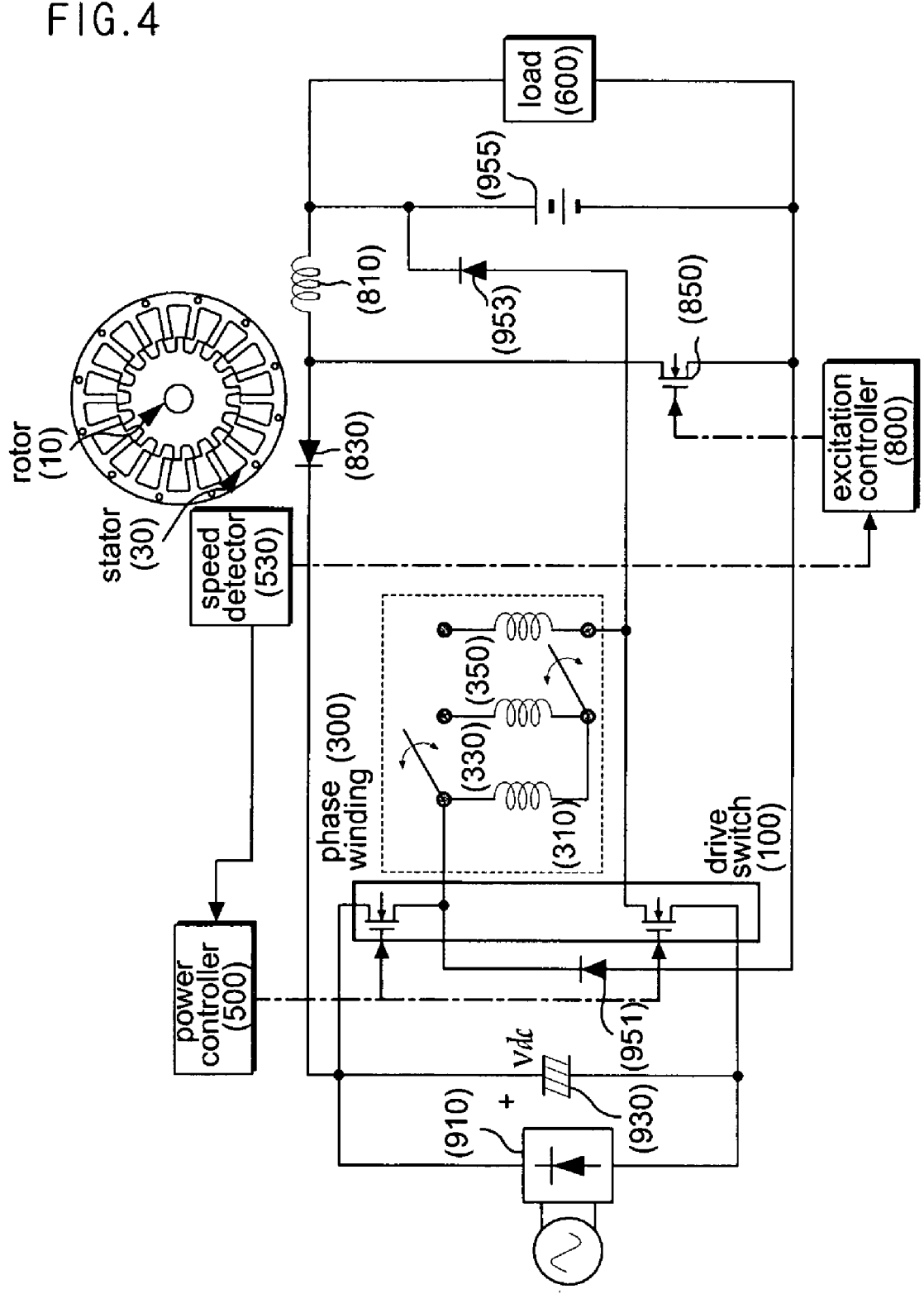
FIG. 4 is a circuit diagram illustrating an SR generator in accordance with another preferred embodiment of the present invention.

FIG. 4 is a circuit diagram illustrating an SR generator in accordance with another preferred embodiment of the present invention. As shown in FIG. 4, it should be noted that the same reference numerals are assigned to components similar to those in the first preferred embodiment of the SR generator. Referring to FIG. 4, the phase winding 300 for use in the SR generator includes: a plurality of unit windings 310, 330, and 350; one or more winding switches 340 and 360 for switching on or off a connection among the unit windings 310, 330, and 350; and a wiring connection controller 700 for controlling a switching operation of the winding switches 340 and 360 so that inductance is increased when a speed detected by the speed detector 530 is low, and is decreased when the speed detected by the speed detector 530 is high, differently from the above SR generator shown in FIG. 5.

Operations of the wiring connection controller 700 will hereinafter be described with reference to the accompanying drawings. The wiring connection controller 700 controls a switching operation of the winding switches 340 and 360 contained in the phase winding 300 according to the speed detected by the speed detector 530, and changes a wiring connection scheme of the unit windings 310, 330, and 350 to another scheme.

Figure 5:
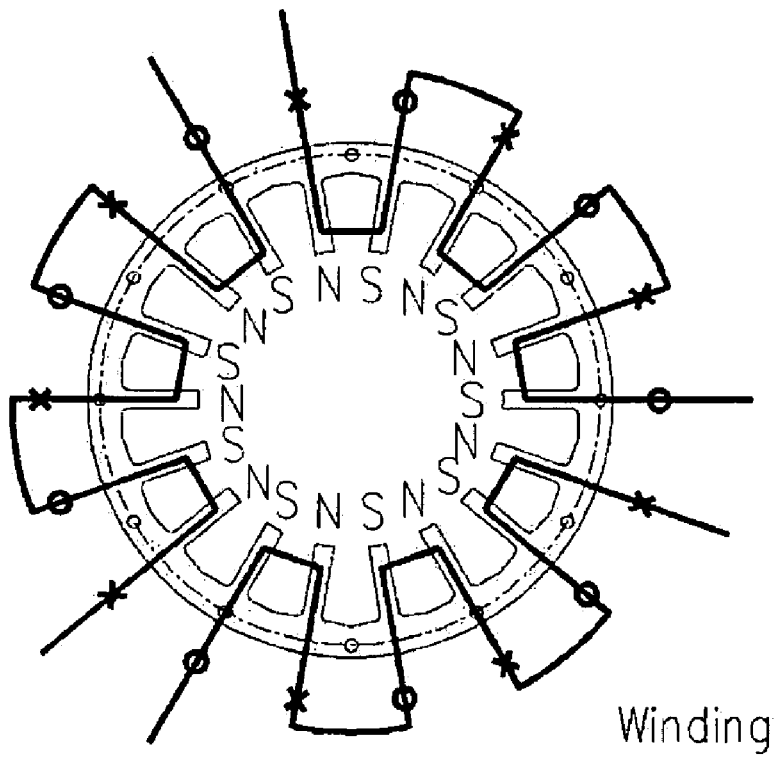
FIG. 5 shows the appearance of a single-phase stator for use in the SR generator shown in FIG. 4, and particularly shows exemplary wiring connection structure of the SR generator including a phase winding composed of three unit windings in accordance with the present invention.

In accordance with a feature of the present invention, the wiring connection controller 700 controls the unit windings 310, 330, and 350 to be connected in series at a low speed, and controls the unit windings 310, 330, and 350 to be connected in parallel to each other at a high speed. As shown in FIG. 4, the phase winding 300 of a single phase includes: three unit windings 310, 330, and 350; and two winding switches 340 and 360 for controlling a wiring connection among the three unit windings 310, 330, and 350. FIG. 5 shows a wiring connection structure of a stator of the above-mentioned SR generator. In accordance with the preferred embodiment of the present invention, radially-arranged stator magnetic poles are divided into predetermined magnetic pole groups, each of which includes predetermined magnetic poles adjacent to each other. Individual unit windings are allocated to individual groups, respectively. The unit windings are wound to allow neighboring magnetic poles to be alternated with each other in each group. In more detail, individual magnetic poles have polarities opposite to neighboring magnetic poles. The magnetic poles of three unit coils are divided into three groups, and one unit winding is wound on each group. In FIG. 5, reference characters O and X are indicative of winding directions of each winding. The stator increases the number of single-phase poles, and improves a wiring connection scheme in such a way that high energy efficiency can be established at a low speed.

Figure 6:
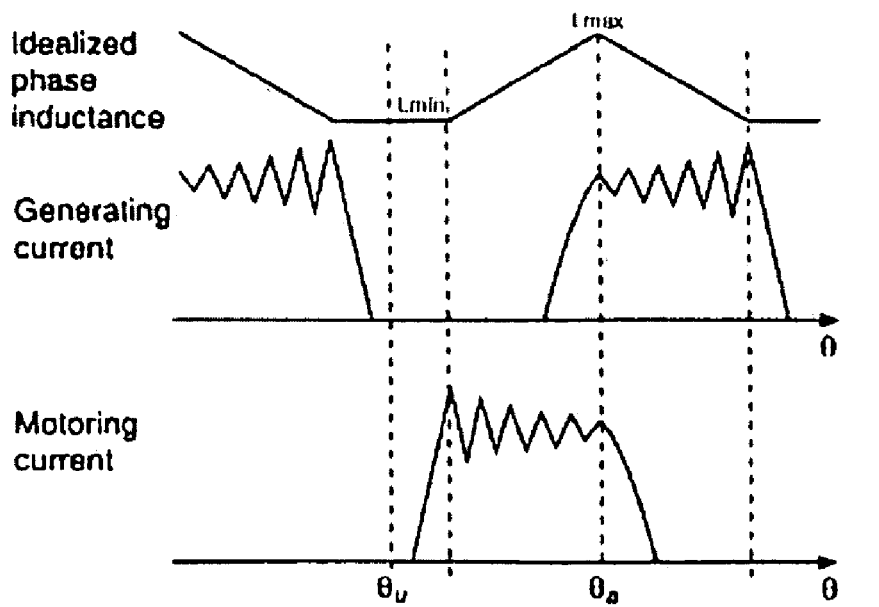
FIG. 6 is a graph illustrating the relationship among a phase inductance, a generator current, and a motor current in association with a phase angle of a rotor in the SR generator in accordance with the present invention.

FIG. 6 is a graph illustrating the relationship among a phase inductance, a generator current, and a motor current in association with a phase angle of a rotor in the SR generator in accordance with the present invention. As shown in FIG. 6, inductance has the highest Lmax at a first condition of θ=θmax, and has the smallest Lmin at a second condition of θ=θmin.

Figure 7A:
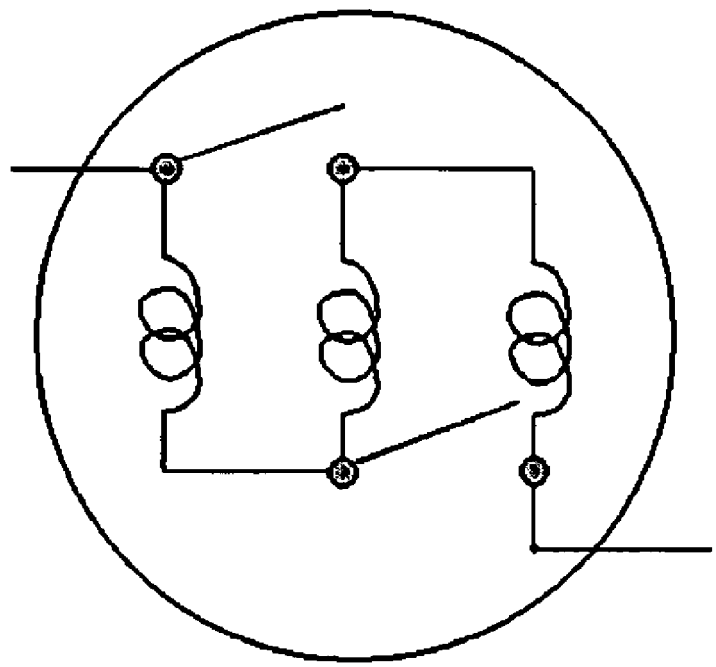
FIG. 7a shows the appearance of wiring connection formed at a low speed in a stator including the wiring connection structure shown in FIG. 5 in accordance with the present invention.
Figure 7B:
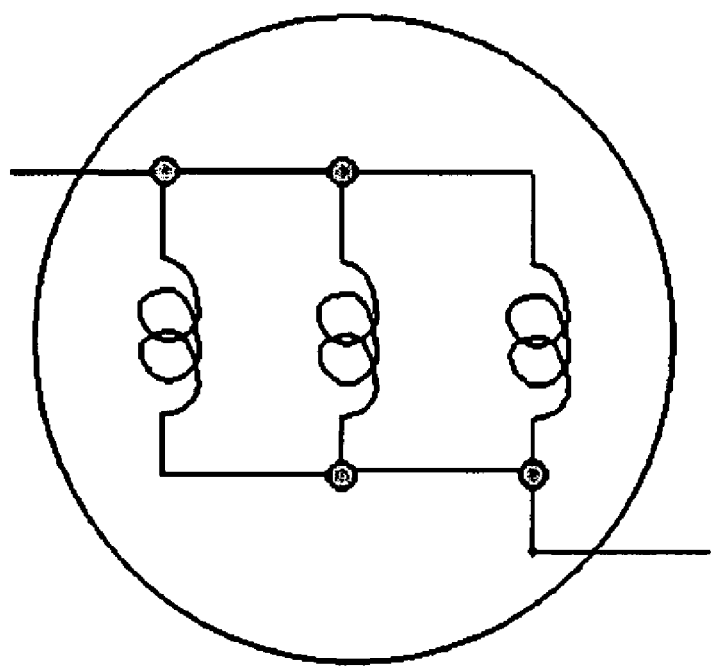
FIG. 7b shows the appearance of wiring connection formed at a high speed in a stator including the wiring connection structure shown in FIG. 5 in accordance with the present invention.
Figure 8A:
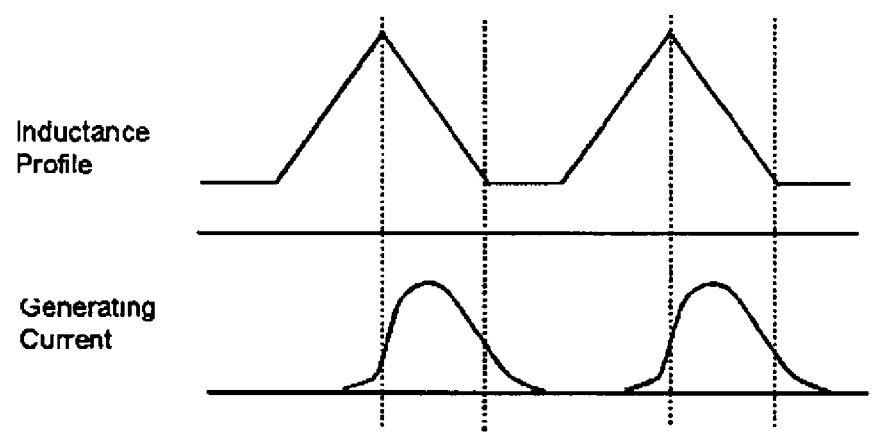
FIG. 8a is a graph illustrating the relationship between an inductance and a generation current at a low speed in a stator including a wiring connection structure shown in FIG. 5 in accordance with the present invention.
Figure 8B:
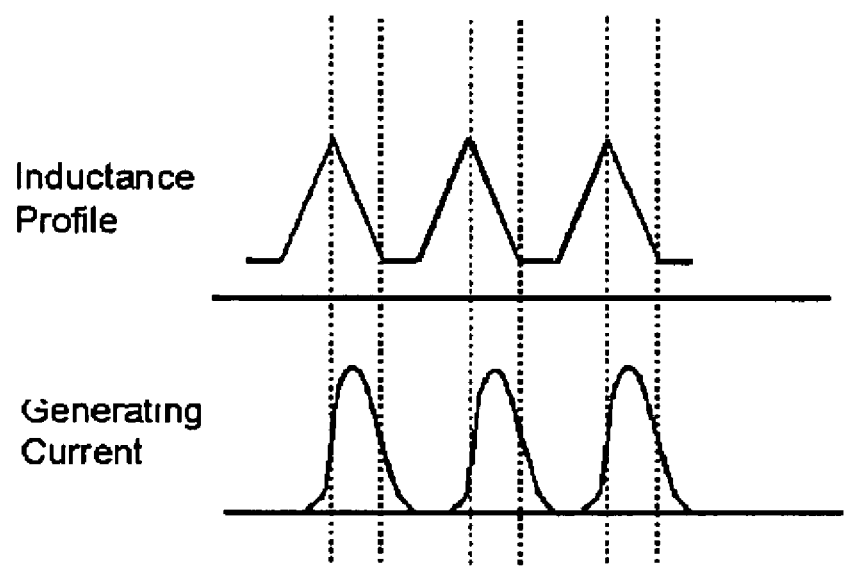
FIG. 8b is a graph illustrating the relationship between an inductance and a generation current at a high speed in a stator including the wiring connection structure shown in FIG. 5 in accordance with the present invention.

FIG. 7a shows the appearance of wiring connection formed at a low speed in the stator including the wiring connection structure shown in FIG. 5. FIG. 7b shows the appearance of wiring connection formed at a high speed in the stator including the wiring connection structure shown in FIG. 5. FIG. 8a is a graph illustrating the relationship between an inductance and a generation current at a low speed in the stator including the wiring connection structure shown in FIG. 5. FIG. 8b is a graph illustrating the relationship between the inductance and the generation current at a high speed in the stator including the wiring connection structure shown in FIG. 5.

Energy generated from the SR generator can be represented by the above-mentioned equation 4:

$$\text{Energy} = \frac{1}{2} i^2 \omega_m \frac{dL}{d\theta} \quad \text{[Equation 4]}$$

As shown in FIG. 8a, in the case of an inductance profile, unit windings are connected in series to each other at a low speed so that inductance is increased. As a result, the values of Lmax and Lmin are also increased, and the value of $$\frac{dL}{d\theta}$$

is increased, such that generation efficiency is improved at a low speed. In the case of an excitation current, the value of Lmax is high at a low speed, but a sufficient time for excitation is guaranteed because of the low speed, and an excitation voltage is boosted so that a sufficient excitation current can be obtained in accordance with another aspect of the present invention. Therefore, although generation energy formed at a low speed has a low angular velocity ω, the value of $$\frac{dL}{d\theta}$$

is very high, so that sufficient generation is provided.

In the meantime, since the unit windings are connected in parallel to each other at a high speed, inductance is decreased. As a result, the values of Lmax and Lmin are also decreased, the value of $$\frac{dL}{d\theta}$$

is decreased, and the angular velocity ω is high. In accordance with another aspect of the present invention, an excitation voltage is boosted so that a sufficient excitation current can be obtained and electric generation is improved.

As apparent from the above description, the above-mentioned SR generator boosts an excitation voltage at a low speed and a high speed, and guarantees a sufficient excitation current, such that generation efficiency is improved at a low speed and a high speed.

The SR generator boosts a voltage of a battery in which a generated voltage is charged, and provides an excitation capacitor with the boosted battery voltage, such that it can improve generation efficiency using a minimum number of components without including an additional power-supply unit.

Furthermore, the SR generator increases inductance of a stator winding at a low speed, and reduces the inductance of the stator winding at a high speed, such that a change rate between the inductance and a phase angle is increased at a low speed, and output energy is also increased at the low speed, thereby improving generation efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Switched Reluctance (SR) generator comprising:
    an excitation capacitor which provides a phase winding with an excitation current;
    a current source connected to the excitation capacitor which generates an initial excitation current that charges the excitation capacitor;
    a step-up converter arranged between a battery that stores generated power and the excitation capacitor, and which boosts a voltage of the battery and provides the excitation capacitor with the boosted voltage;
    a speed detector that detects a rotation speed of a rotor; and
    an excitation controller that operates the step-up converter in response to the detected rotor rotation speed being equal to or less than a predetermined speed.

2. The SR generator according to claim 1, wherein the excitation controller increases an excitation current in inverse proportion to the rotor rotation speed.

3. The SR generator according to claim 1, wherein the step-up converter is a boost converter.

4. A Switched Reluctance (SR) generator comprising:
    an excitation capacitor which transmits an excitation current to a phase winding comprising a plurality of unit windings, connections of which are switched by one or more winding switches;
    a current source connected to the excitation capacitor which generates an initial excitation current that charges the excitation capacitor;
    a step-up converter arranged between a battery that stores generated power and the excitation capacitor, and which boosts a voltage of the battery and provides the excitation capacitor with the boosted voltage;
    a speed detector that detects a rotation speed of a rotor; and
    an excitation controller that operates the step-up converter in response to the detected rotor rotation speed being equal to or less than a predetermined speed.

5. The SR generator according to claim 4, wherein the one or more winding switches connect the unit windings so that an inductance of the phase winding is increased when the detected rotor rotation speed is a low speed and the inductance of the phase winding is decreased when the detected rotor rotation speed is a high speed.

6. The SR generator according to claim 4, wherein the one or more winding switches connect the unit windings, so that the unit windings are connected in series at a low speed, and are connected in parallel at a high speed.

7. The SR generator according to claim 4, wherein the phase winding has a single-phase structure.

8. The SR generator according to claim 4, wherein:
    in the unit windings of the phase winding, radially-arranged stator magnetic poles are divided into predetermined magnetic pole groups, each of which includes predetermined magnetic poles adjacent to each other, such that each unit winding is allocated to each group, and the unit windings are wound to allow neighboring magnetic poles to be alternated with each other in each group.

9. The SR generator according to claim 4, wherein the excitation controller increases an excitation current in inverse proportion to the rotor rotation speed.

10. The SR generator according to claim 4, wherein the step-up converter is a boost converter.

* * * * *